US009442816B2

(12) United States Patent
Cordero et al.

(10) Patent No.: US 9,442,816 B2
(45) Date of Patent: Sep. 13, 2016

(54) IMPLEMENTING MEMORY PERFORMANCE MANAGEMENT AND ENHANCED MEMORY RELIABILITY ACCOUNTING FOR THERMAL CONDITIONS

(75) Inventors: Edgar R. Cordero, Round Rock, TX (US); Timothy J. Dell, Colchester, VT (US); Joab D. Henderson, Austin, TX (US); Anil B. Lingambudi, Bangalore (IN); Girisankar Paulraj, Bangalore (IN); Diyanesh B. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 13/307,149

(22) Filed: Nov. 30, 2011

(65) Prior Publication Data

US 2013/0138901 A1    May 30, 2013

(51) Int. Cl.
*G06F 13/00* (2006.01)
*G06F 11/30* (2006.01)
*G06F 11/16* (2006.01)

(52) U.S. Cl.
CPC ....... *G06F 11/3037* (2013.01); *G06F 11/1658* (2013.01); *G06F 11/1666* (2013.01); *G06F 11/3058* (2013.01); *G06F 2201/81* (2013.01)

(58) Field of Classification Search
CPC ........ G06F 12/00; G06F 12/16; G06F 11/14; G01K 1/00; G01K 3/00
See application file for complete search history.

(56) References Cited

U.S. PATENT DOCUMENTS

| | | |
|---|---|---|
| 7,099,794 B2 | 8/2006 | LeClerg et al. |
| 7,137,020 B2 | 11/2006 | Gilstrap et al. |
| 7,421,598 B2 | 9/2008 | Brittain et al. |
| 7,596,714 B2 | 9/2009 | Rothman et al. |
| 7,797,506 B2 | 9/2010 | Rangarajan et al. |
| 7,984,250 B2 | 7/2011 | Steinbrecher et al. |
| 2005/0135176 A1 | 6/2005 | Ramakrishnan et al. |
| 2006/0111866 A1* | 5/2006 | LeClerg et al. ............... 702/130 |
| 2008/0120485 A1* | 5/2008 | Rothman et al. ............ 711/165 |
| 2008/0155136 A1* | 6/2008 | Hishino ......................... 710/26 |
| 2009/0125695 A1* | 5/2009 | Rangarajan et al. ......... 711/170 |
| 2009/0216985 A1* | 8/2009 | O'Connor et al. ........... 711/170 |
| 2010/0180089 A1 | 7/2010 | Flemming et al. |
| 2011/0029150 A1* | 2/2011 | Wyatt .......................... 700/299 |
| 2011/0231697 A1 | 9/2011 | Berke et al. |
| 2013/0275665 A1* | 10/2013 | Saraswat et al. ............. 711/106 |

\* cited by examiner

*Primary Examiner* — Charles Rones
*Assistant Examiner* — Han Doan
(74) *Attorney, Agent, or Firm* — Joan Pennington

(57) ABSTRACT

A method, system and computer program product implement memory performance management and enhanced memory reliability of a computer system accounting for system thermal conditions. When a primary memory temperature reaches an initial temperature threshold, reads are suspended to the primary memory and reads are provided to a mirrored memory in a mirrored memory pair, and writes are provided to both the primary memory and the mirrored memory. If the primary memory temperature reaches a second temperature threshold, write operations to the primary memory are also stopped and the primary memory is turned off with DRAM power saving modes such as self timed refresh (STR), and the reads and writes are limited to the mirrored memory in the mirrored memory pair. When the primary memory temperature decreases to below the initial temperature threshold, coherency is recovered by writing a coherent copy from the mirrored memory to the primary memory.

14 Claims, 5 Drawing Sheets

IMPLEMENTING MEMORY PERFORMANCE MANAGEMENT AND ENHANCED MEMORY RELIABILITY ACCOUNTING FOR THERMAL CONDITIONS

FIELD OF THE INVENTION

The present invention relates generally to the data processing field, and more particularly, relates to a method, system and computer program product for implementing memory performance management and enhanced memory reliability of a computer system, such as a server computer system, accounting for system thermal conditions.

DESCRIPTION OF THE RELATED ART

Reliability, Availability and Serviceability (RAS) are important features of any memory and computer system. Memory RAS features are increasingly important in various computer and server market segments. Memory RAS features include, for example, memory mirroring, memory sparing, memory Redundant Array of Independent Disks (RAID), and the like.

A thermal management device has been used with a memory system of memory modules, such as Dual In-Line Memory Modules (DIMMs) to control memory temperature. One widely adopted technique is to increase the speed of fans, so that the increased air flow reduces the temperature of the hotter modules. However even with maximum fan speed during peak memory traffic conditions, there may be situations where the DIMM temperature continues to increase beyond certain safe threshold limits.

For example, with a thermal management unit failure or malfunction, bad dynamic random access memory (DRAM) components, bad or weaker DIMMs, and the like, the DIMM temperature can increase beyond safe threshold limits.

During this situation, the processor throttles the memory traffic on the memory bus in order to reduce the read and write traffic on the DIMMs and thereby to reduce temperature. Though this technique is very useful to overcome any thermal runaway conditions, with memory traffic throttling the system performance is undesirably degraded.

A need exists for an effective mechanism for implementing memory performance management and enhanced memory reliability of a computer system accounting for system thermal conditions. It is desirable that such mechanism avoids memory throttling, while providing sustained memory performance and avoiding any DIMM failures from severe thermal conditions.

Mirrored memory is a configuration where the primary memory which is used by the system is mirrored by an exact copy by other memory. All writes typically are performed to both the primary memory and the mirrored memory. If a read to the primary memory contains an error, a read is performed to the mirrored memory in order to obtain the correct data.

SUMMARY OF THE INVENTION

Principal aspects of the present invention are to provide a method, system and computer program product for implementing a method, system and computer program product for implementing memory performance management and enhanced memory reliability of a computer system accounting for system thermal conditions. Other important aspects of the present invention are to provide such method, system and computer program product substantially without negative effects and that overcome many of the disadvantages of prior art arrangements.

In brief, a method, system and computer program product are provided for implementing memory performance management and enhanced memory reliability of a computer system accounting for system thermal conditions. When a primary memory temperature reaches an initial temperature threshold, reads are suspended to the primary memory and reads are provided to a mirrored memory in a mirrored memory pair, and writes are provided to both the primary memory and the mirrored memory.

In accordance with features of the invention, if temperature of the primary memory further increases and reaches a second temperature threshold, write operations to the primary memory are also stopped and the primary memory is turned off with DRAM power saving modes such as self timed refresh (STR), and the reads and writes are limited to the mirrored memory in the mirrored memory pair. When the primary memory temperature decreases to below the initial temperature threshold, coherency is recovered by writing a coherent copy from the mirrored memory to the primary memory. At this point the primary memory is available for normal use.

In accordance with features of the invention, during the time after the primary memory temperature reaches the initial temperature threshold if an error is detected from the mirrored memory, a read will be performed to the primary memory in order to attempt to recover the correct data. The roles of the primary and mirrored memory are temporarily effectively reversed in order to maintain as much reliability as possible. If eliminating reads to the primary memory is sufficient to reduce the temperature of the primary memory back to acceptable levels, reads may then be resumed to the primary memory. The operation of the system returns to normal where reads are performed from the primary memory and reads to the mirrored memory are reserved for when errors are detected on the primary memory.

In accordance with features of the invention, thermal mitigation for mirrored memory devices avoids memory failure from severe thermal conditions, sustaining memory performance without throttling memory traffic.

In accordance with features of the invention, the mirrored memory includes a plurality of Dual In-Line Memory Modules (DIMMs). Respective pairs of DIMMs are used for memory mirroring. Both memory copies in the mirrored memory pair are written to with identical data and if an error is detected on the primary memory, the mirrored memory is read in order to obtain the correct data.

In accordance with features of the invention, a profiling process for the mirrored memory is optionally performed to identify and store a temperature profile of the DIMMs. Then mirrored DIMM pairs are chosen such that the DIMMs of the primary memory are in a cooler location and the DIMMs of the mirrored memory are in a hotter location.

In accordance with features of the invention, hotter DIMMs optionally are set to be mirrored to another set of cooler DIMMs during initial program load (IPL) of the system. The DIMMs are monitored for temperature using a thermal power management device or temperature monitor.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing memory performance management and enhanced memory reliability in a computer system accounting for system thermal conditions.

In accordance with features of the invention, the method, system and computer program product provide thermal mitigation for mirrored memory devices sustaining memory performance without throttling memory traffic.

Figure 1:
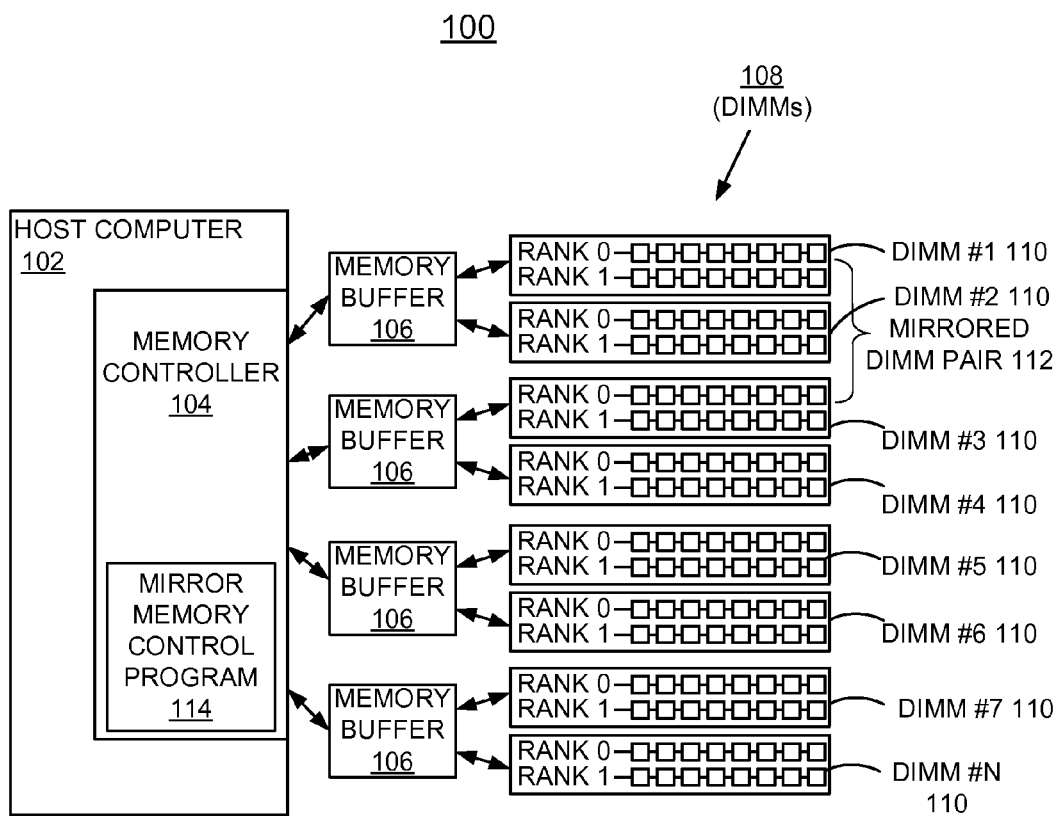
FIG. 1 is a block diagram representation illustrating an example system for implementing memory performance management and enhanced memory reliability accounting for system thermal conditions in accordance with the preferred embodiment.

Having reference now to the drawings, in FIG. 1, there is shown an example computer system generally designated by the reference character 100 for implementing memory performance management and enhanced memory reliability accounting for system thermal conditions in accordance with the preferred embodiment.

Computer system 100 includes a host computer 102 including a memory controller 104 coupled by a plurality of memory buffers 106 to a mirrored memory 108, such as a dynamic random access memory (DRAM) including a plurality of Dual In-Line Memory Modules (DIMMs) 1–N, 110 and including respective mirrored DIMM pairs 112, one shown. In FIG. 1, the illustrated mirrored DIMM pair 112 includes DIMM #1, 110 and DIMM #3, 110.

Computer system 100 includes a mirror memory control program 114 of the preferred embodiment. Memory controller 104 is suitably programmed by the mirror memory control program 114 to execute the flow chart of FIG. 4 of the preferred embodiment.

Computer system 100 implements enhanced memory reliability of mirrored memory 108 while accounting for system thermal conditions and providing effective memory performance management in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

Figure 2:
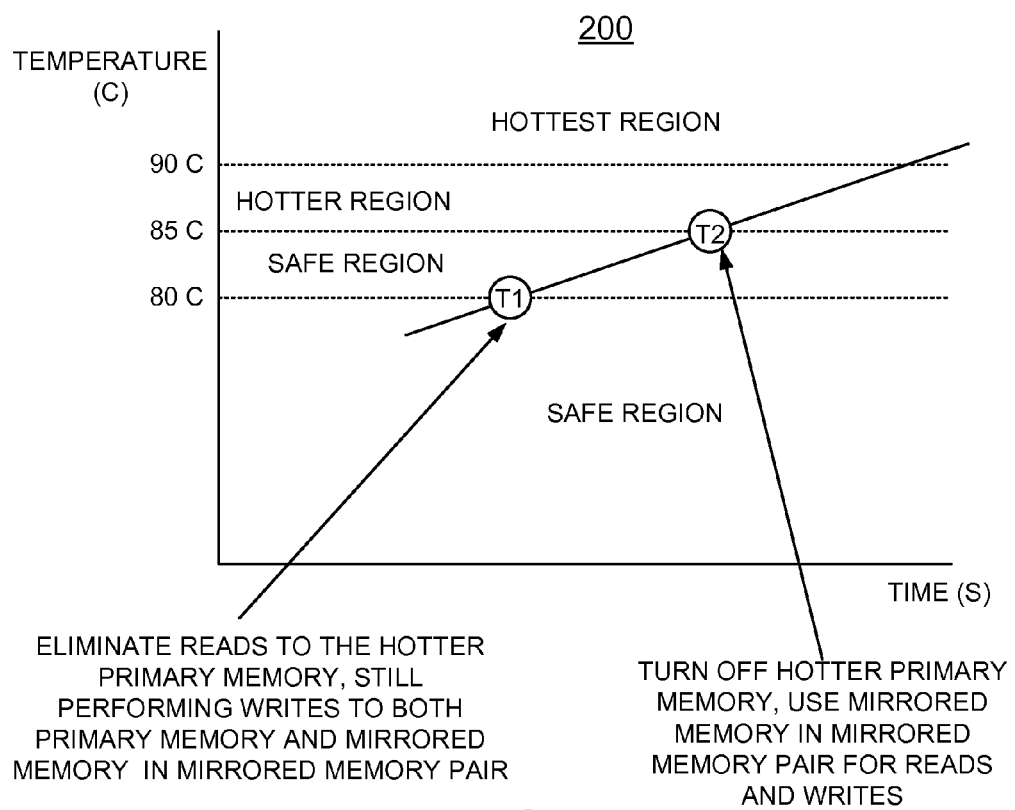
FIG. 2 is a chart illustrating exemplary operations of the example system of FIG. 1 for implementing memory performance management and enhanced memory reliability accounting for system thermal conditions in accordance with the preferred embodiment.

Referring to FIG. 2, there is shown a chart generally designated by the reference character 200 illustrating exemplary operations of the example system 100 for implementing memory performance management and enhanced memory reliability of mirrored memory in accordance with the preferred embodiment. In FIG. 2, temperature is shown with respect to the vertical axis and time is shown with respect to the horizontal axis.

A first or initial threshold temperature indicated by a dotted line T1 is located within a safe operating region. When the temperature of a primary memory device, such one DIMM #1, 110 of the mirrored DIMM pair 112 of FIG. 1 reaches the initial threshold temperature T1, reads to the primary DIMM #1, 110 are eliminated, with reads limited to the mirrored memory #3, 110 in the mirrored memory pair 112, and writes are provided to both the primary DIMM #1, 110 and the mirrored DIMM #3, 110 of the mirrored memory pair 112.

A second threshold temperature indicated by a dotted line T2 is located at an upper boundary of the safe operating region. If temperature of the primary memory of the mirrored memory pair further increases and reaches the second threshold temperature write operations are stopped also and the hot primary DIMM #1, 110 is turned off, and the reads and writes are limited to the mirrored DIMM #3, 110 in the mirrored memory pair 112.

In accordance with features of the invention, when the primary DIMM #1, 110 temperature decreases to below the initial threshold temperature T1, coherency is recovered by writing a coherent copy to primary DIMM #1, 110 from the mirrored DIMM #3, 110 and full operation and mirroring is resumed with the primary DIMM #1, 110 of the mirrored memory pair 112 available for normal use.

Figure 3:
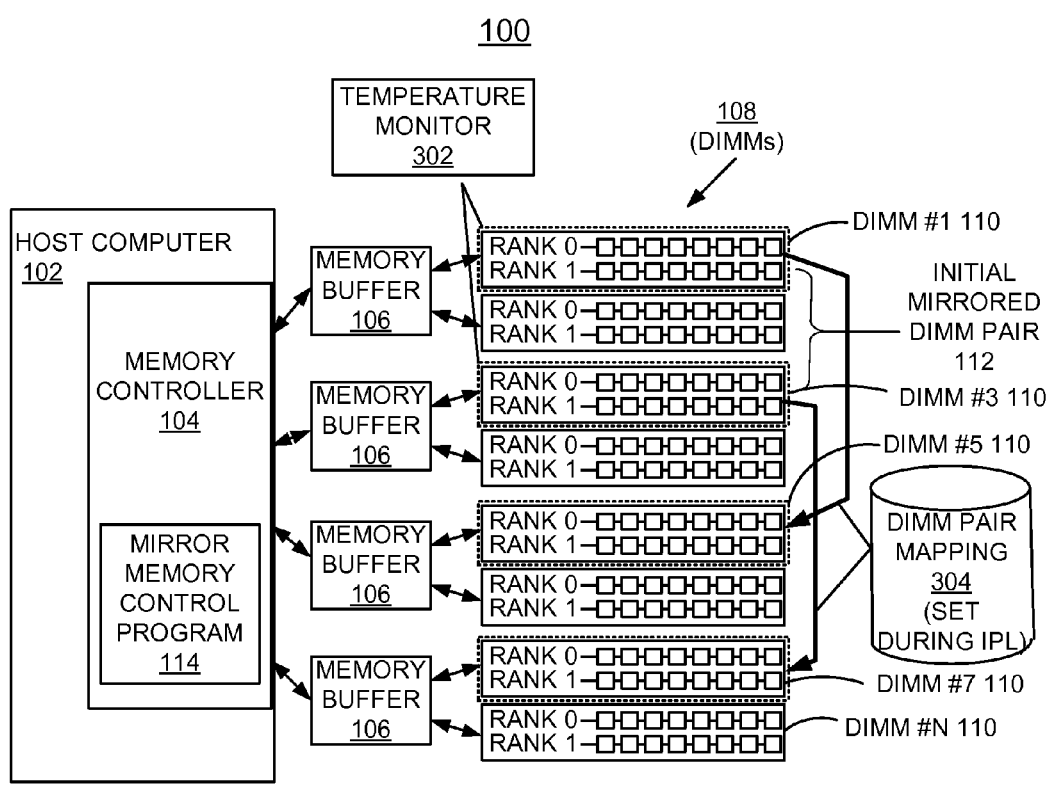
FIG. 3 is a more detailed diagram illustrating the example system of FIG. 1 for implementing memory performance management and enhanced memory reliability of mirrored memory in accordance with the preferred embodiment.

Referring to FIG. 3, there is shown a more detailed diagram illustrating the system 100 together with example operations for implementing memory performance management and enhanced memory reliability of mirrored memory 108 in accordance with the preferred embodiment.

A thermal profile of the mirrored memory 108 can include narrow temperature margins because of severe real-estate and space constraints, for example, a temperature monitor 302 is provided with one or more memory module locations, such as locations of the memory devices DIMM #1, 110 and DIMM #3, 110 that are susceptible to high temperature rise, during peak sustained memory traffic conditions. These DIMM modules DIMM #1, 110 and DIMM #3, 110 may hit the maximum temperature threshold limits sooner compared to other DIMMs in the system. If unprotected, these DIMM modules DIMM #1, 110 and DIMM #3, 110 may fail permanently due to thermal overload.

A DIMM pair mapping function 304 is used during an initial program load (IPL), for example, replacing the initial mirrored memory pair 112 of the memory devices DIMM #1, 110 and DIMM #3, 110 with a first mirrored memory pair 112 of the memory devices DIMM #1, 110 and DIMM #5, 110 and a second mirrored memory pair 112 of the memory devices DIMM #3, 110 and DIMM #7, 110. The first mirrored memory pair 112 includes the memory devices DIMM #1, 110 and the second mirrored memory pair 112 includes the memory devices DIMM #3, 110 that are identified as being susceptible to high temperature rise, during peak sustained memory traffic conditions.

A system characterization and validation cycle is performed, for example, to determine an overall system memory thermal profile at worst case scenarios. One example is that the thermal profile of mirrored memory 108 can be pushed to maximum limits with memory targeted workload running on mirrored memory or maximum sustained traffic, while the host processor memory controller 104 is operating at speed optimized mode. This worst case thermal scenario can identify the hot DIMM spots of the mirrored memory 108, such as the DIMM #1, 110 and DIMM #3, 110 shown with the temperature monitor 302 in FIG. 3.

In accordance with features of the invention, the identified hot memory devices, such as DIMM #1, 110 and DIMM #3, 110 are mirrored to other memory such as DIMMs #5 and #7, 100 at cooler locations during initial program load (IPL) of the mirrored memory 108 and system 100. The temperature of all the memory devices such as the indicated memory devices, DIMM #1, 110 and DIMM #3, 110 are monitored for temperature with an available thermal power management function or temperature monitor 302.

Figure 4:
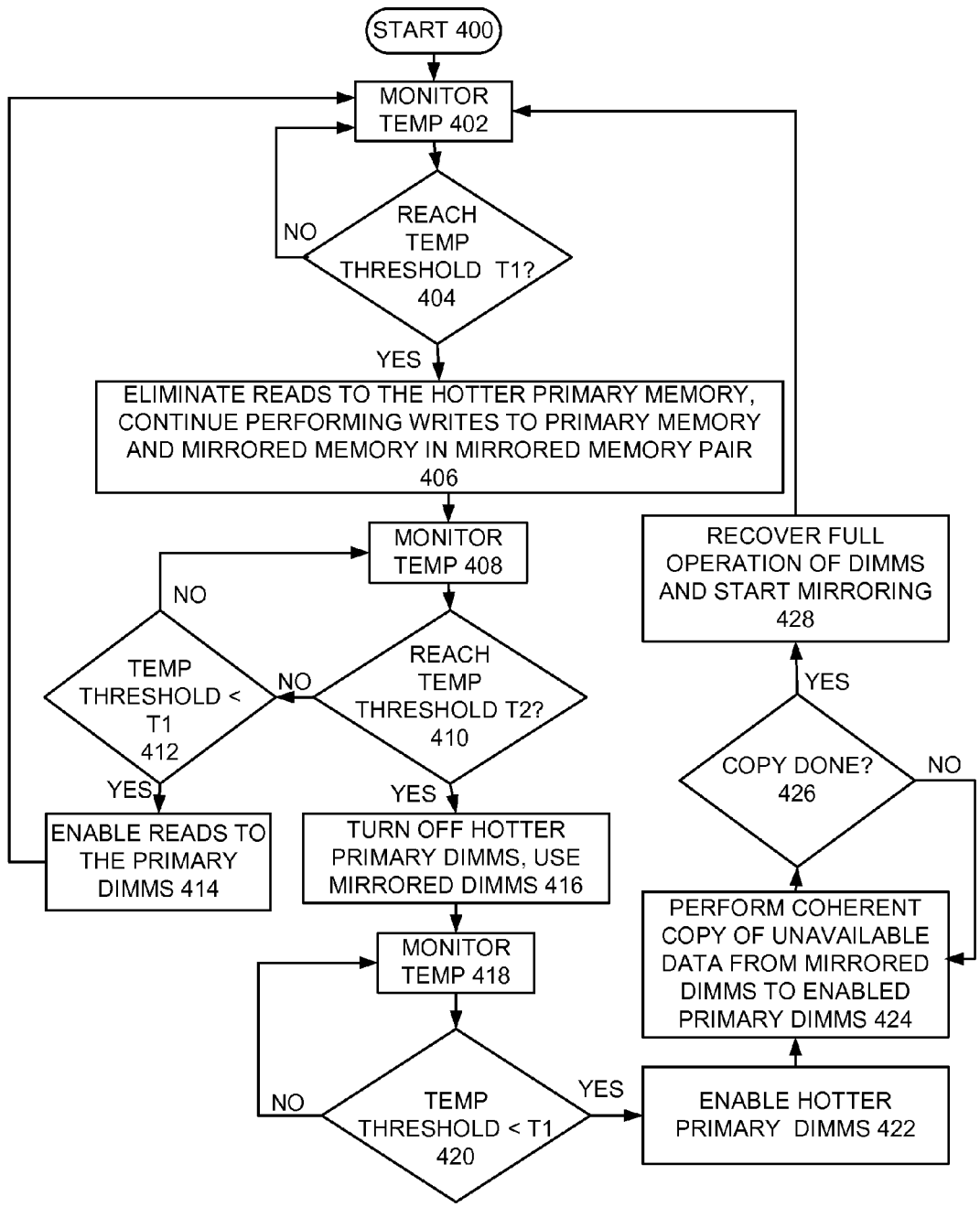
FIG. 4 is a flow chart illustrating exemplary operations for implementing memory performance management and enhanced memory reliability accounting for system thermal conditions in accordance with the preferred embodiments.

Referring also to FIG. 4, there are shown exemplary operations for implementing memory performance management and enhanced memory reliability accounting for system thermal conditions in accordance with the preferred embodiments starting at a block 400.

Temperature monitoring of the primary memory or primary DIMMs of the mirrored memory 108 is performed as indicated at a block 402. As indicated at a decision block 404, checking whether the temperature of the primary memory of a mirrored memory pair has reached an initial threshold temperature T1 is performed. Temperature monitoring is continued at block 402 when the primary memory temperature has not reached the initial threshold temperature. When the primary memory temperature reaches the initial threshold temperature T1, reads are suspended to the primary memory and reads are provided to the mirrored memory in the mirrored memory pair including the hot primary memory, and writes are provided to both the primary memory and the mirrored memory of the mirrored memory pair as indicated at a block 406. Temperature monitoring of the primary memory is performed as indicated at a block 408.

As indicated at a decision block 410, checking whether the primary memory temperature has reached a second threshold temperature T2 is performed. As indicated at a decision block 412, when temperature of the primary memory has not reached the second threshold temperature T2 checking whether the primary memory temperature has decreased to below the initial threshold temperature T1 is performed. If the temperature decreased below threshold T1, then reads can be resumed to the primary memory or primary DIMMs and reads to the primary memory or primary DIMMs are enabled as indicated at a block 414. Then temperature monitoring is continued at block 402.

When temperature of the primary memory or primary DIMMs further increases and reaches the second threshold temperature T2, write operations are stopped also and the primary memory or primary DIMMs are turned off and the reads and writes to the mirrored memory in the mirrored memory pair are provided as indicated at a block 416.

Temperature monitoring of the primary memory is performed as indicated at a block 418. As indicated at a decision block 420, checking whether the primary memory or primary DIMMs temperature has decreased below the initial threshold temperature T1 is performed. If the primary memory temperature has not decreased below the initial threshold temperature T1 temperature monitoring continues at block 418.

When the primary memory temperature decreases below the initial threshold temperature, the primary memory DIMMs are enabled as indicated at a block 422. Coherency is recovered by writing a coherent copy of unavailable data from the mirrored memory DIMMs to the enabled primary memory DIMMs as indicated at a block 424.

Checking if the copy is complete is performed as indicated at a decision block 426. If the copy is not completed, copying from the mirrored DIMMs to the enabled primary DIMMs is continued at block 424. When the copy is complete, full operation of the primary DIMMs is recovered and mirroring is started as indicated at a block 428. Then temperature monitoring is continued at block 402.

Figure 5:
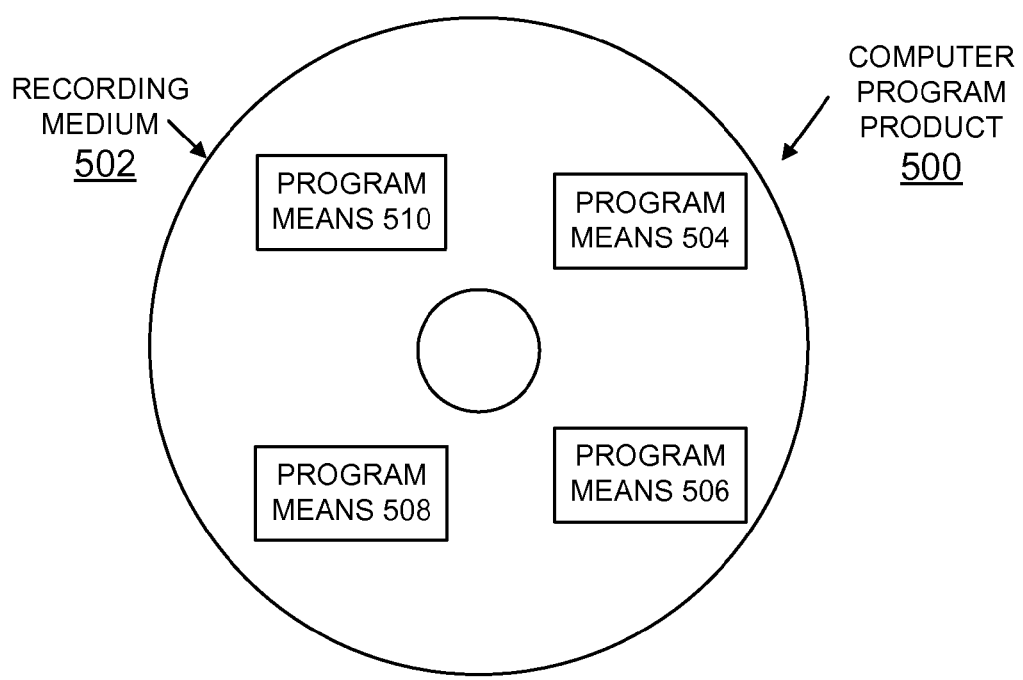
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing memory performance management and enhanced memory reliability accounting for system thermal conditions of the preferred embodiment in the system 100 of FIG. 1.

A sequence of program instructions or a logical assembly of one or more interrelated modules defined by the recorded program means 504, 506, 508, and 510, direct the computer system 100 for implementing memory performance management and enhanced memory reliability accounting for system thermal conditions of the preferred embodiment.

While the present invention has been described with reference to the details of the embodiments of the invention shown in the drawing, these details are not intended to limit the scope of the invention as claimed in the appended claims.

What is claimed is:

1. A method for implementing memory performance management and enhanced memory reliability of a computer system comprising:
   monitoring temperature of a memory, monitoring temperature of the memory includes identifying a thermal profile of the memory;
   identifying a first temperature threshold for a primary memory being exceeded, responsively suspending reads to the primary memory and performing reads to a mirrored memory in a mirrored memory pair; responsive to detecting an error from the mirrored memory during the first temperature for the primary memory being exceeded, temporarily performing reads to the primary memory for recovering correct data, and performing writes to both the primary memory and the mirrored memory;

identifying a second temperature threshold for the primary memory, turning off the primary memory in response to said second temperature threshold greater than said first temperature threshold, and responsively limiting reads and writes to the mirrored memory in the mirrored memory pair; and identifying temperature decrease below said first temperature threshold for the primary memory, and responsively enabling the primary memory, and performing a coherent copy of unavailable data from mirrored memory to the enabled primary memory, recovering coherency of the primary memory and the mirrored memory, and recovering full operation of mirrored memory and primary memory, start mirroring and continue temperature monitoring in response to recovering coherency of the primary memory and the mirrored memory completed.

2. The method as recited in claim 1 wherein the memory includes a plurality of Dual In-Line Memory Modules (DIMMs); and includes identifying respective pairs of DIMMs for each said mirrored memory pair.

3. The method as recited in claim 1 wherein the memory includes a plurality of Dual In-Line Memory Modules (DIMMs) and includes performing a profiling process for the memory, identifying and storing a temperature profile of each of said plurality of DIMMs.

4. The method as recited in claim 3 includes identifying respective pairs of DIMMs for each said mirrored memory pair of the memory, each identified mirrored memory pair including DIMMs of primary memory having a cooler location and DIMMs of mirrored memory having a hotter location.

5. The method as recited in claim 1 wherein the memory includes a plurality of Dual In-Line Memory Modules (DIMMs); and includes providing cooler primary DIMMs being mirrored to hotter mirrored DIMMs in mirrored DIMM pairs during a system initial program load (IPL).

6. The method as recited in claim 1 includes identifying hot memory locations and identifying said mirrored memory pair including one identified hot memory location, providing a temperature monitor with said one identified hot memory location.

7. A system for implementing memory performance management and enhanced memory reliability in a computer system comprising:
a memory including one or more mirrored memory pairs, each mirrored memory pair comprising a primary memory and a mirrored memory;
a memory controller coupled to said memory;
a temperature monitor coupled to said memory;
a mirrored memory control;
said mirrored memory control monitoring temperature of the memory, monitoring, by the temperature monitor, temperature of the memory includes said mirrored memory control identifying a thermal profile of the memory; identifying a first temperature threshold for the primary memory being exceeded, responsively suspending reads to the primary memory and performing reads to the mirrored memory in said mirrored memory pair; responsive to detecting an error from the mirrored memory during the first temperature for the primary memory being exceeded, temporarily performing reads to the primary memory for recovering correct data, and performing writes to both the primary memory and the mirrored memory; identifying a second temperature threshold for the primary memory being exceeded, said second temperature threshold greater than said first temperature threshold, responsively turning off the primary memory, and limiting reads and writes to the mirrored memory in the mirrored memory pair; and identifying temperature decrease below said first temperature threshold for the primary memory, and responsively enabling the primary memory, and performing a coherent copy of unavailable data from mirrored memory to the enabled primary memory, recovering coherency of the primary memory and the mirrored memory, and recovering full operation of mirrored memory and primary memory, start mirroring and continue temperature monitoring in response to recovering coherency of the primary memory and the mirrored memory completed.

8. The system as recited in claim 7 wherein the memory includes a plurality of Dual In-Line Memory Modules (DIMMs).

9. The system as recited in claim 8 includes said mirrored memory control identifying and storing a temperature profile of each of said plurality of DIMMs.

10. The system as recited in claim 8 includes said mirrored memory control identifying respective DIMM pairs for said one or more mirrored memory pairs, said identified respective DIMM pairs including cooler primary DIMMs and mirrored hotter mirrored DIMMs.

11. The system as recited in claim 10 wherein said mirrored memory control identifying respective DIMM pairs for said one or more mirrored memory pairs includes identifying said respective DIMM pairs during a system initial program load (IPL).

12. The system as recited in claim 7 wherein said mirrored memory control includes a mirrored memory control computer program product tangibly embodied on a non-transitory computer readable storage medium.

13. The system as recited in claim 7 includes said mirrored memory control identifying hot memory locations and identifying said one or more mirrored memory pair including one identified hot memory location.

14. The system as recited in claim 7 includes said mirrored memory control identifying said one or more mirrored memory pair during a system initial program load (IPL).

* * * * *